United States Patent
Pritchard et al.

(10) Patent No.: US 8,255,197 B2
(45) Date of Patent: Aug. 28, 2012

(54) SIMULATION OF TUNING EFFECTS FOR A SERVO DRIVEN MECHATRONIC SYSTEM

(75) Inventors: John Pritchard, Cedarburg, WI (US); Mark A. Chaffee, Chagrin Falls, OH (US); Graham Elvis, Norton Canes (GB)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 693 days.

(21) Appl. No.: 12/242,403

(22) Filed: Sep. 30, 2008

(65) Prior Publication Data

US 2010/0082314 A1 Apr. 1, 2010

(51) Int. Cl.
*G06F 17/50* (2006.01)

(52) U.S. Cl. .............. 703/13; 700/245; 714/25

(58) Field of Classification Search .............. 703/7, 13, 703/2, 6; 700/56, 245; 706/19; 714/25, 714/26, 45; 702/79; 701/11; 324/207.25; 73/660
See application file for complete search history.

(56) References Cited

U.S. PATENT DOCUMENTS

| | | | | |
|---|---|---|---|---|
| 7,868,610 | B2 * | 1/2011 | Velinsky et al. | 324/207.25 |
| 2002/0111758 | A1 * | 8/2002 | Wang et al. | 702/79 |
| 2004/0030461 | A1 * | 2/2004 | Flores et al. | 701/1 |
| 2004/0049368 | A1 * | 3/2004 | Hamm et al. | 703/2 |
| 2004/0144177 | A1 * | 7/2004 | Flock et al. | 73/660 |
| 2006/0048015 | A1 * | 3/2006 | Bardelang et al. | 714/45 |
| 2006/0184280 | A1 * | 8/2006 | Oddsson et al. | 700/245 |
| 2007/0067678 | A1 * | 3/2007 | Hosek et al. | 714/25 |
| 2007/0283188 | A1 * | 12/2007 | Balzer et al. | 714/26 |
| 2008/0033897 | A1 * | 2/2008 | Lloyd | 706/19 |
| 2008/0039959 | A1 * | 2/2008 | Fister et al. | 700/56 |

* cited by examiner

*Primary Examiner* — Kandasamy Thangavelu
(74) *Attorney, Agent, or Firm* — Turocy & Watson, LLP; Raymond Speroff

(57) ABSTRACT

A servo driven mechatronic system simulator and analyzer utilizing preconfigured motion equipment profile databases to predict the behavior of a motion system based on a user selected configuration. The user can adjust the parameters and rerun the simulation and analysis many times in an efficient manner until the optimum operating conditions of the desired system are reached. The user can then archive the system design and implement the system with a greater level of confidence in the ability of the design to meet the requirements of the application.

20 Claims, 14 Drawing Sheets

SIMULATION OF TUNING EFFECTS FOR A SERVO DRIVEN MECHATRONIC SYSTEM

TECHNICAL FIELD

The subject invention relates generally to industrial control systems, and more particularly to motion simulation systems that interact with industrial control system databases based in part on selecting and analyzing motion components and behaviors.

BACKGROUND

Motion controllers are special-purpose computers utilized for controlling motors, drives, and other aspects of a mechatronic system. Designing a system where drive technology is utilized is difficult because of the complexities and unknowns involved in a motion system. For instance, what system load to motor inertia ratio is acceptable, how will compliance and/or backlash between the load and the motor impact performance and what performance can be expected. The difficulty in answering these and many other questions are related to the complex relationship between load, mechanism, servo motor, feedback, servo drive, controller and gain settings.

Typically, determining answers to these questions involved building a prototype machine and conducting empirical tests to collect data and determine the proper combinations of machinery and configuration parameters. Another possibility for a few designs included the use of general simulation software if the intended design fit within the constraints of the simulation software. Even for those designs meeting the narrow constraints of the general simulation software, the task was difficult because of the requirement of large amounts of design information that was unknown at design time.

The large expense and specific requirements of this type of system has created market pressure for a system that can simulate a servo driven mechatronic system for allowing the selection of components to build the system without the necessity of prototyping the machinery or knowing many of the system dynamics details. In another aspect, market pressure requires ease of use of the simulation system with regard to knowledge of servo driven systems. There is a need in the market for a system that is aware of currently available hardware and configurations and does not require the user of the system to provide all the intelligence of what hardware to select and what parameters to configure and their values.

SUMMARY

The following presents a simplified summary in order to provide a basic understanding of some aspects described herein. This summary is neither an extensive overview nor is intended to identify key/critical elements or to delineate the scope of the various aspects described herein. Its sole purpose is to present some concepts in a simplified form as a prelude to the more detailed description presented later.

The innovation includes a system and methods to simulate the operation of a servo driven mechatronic system and allow the tuning of the system based on the components either manually selected by the user from a database or automatically selected from the database by the system. The entire servo driven mechatronic system is represented graphically and run in a simulated mode to provide the user with design parameters and configurations allowing successful matching of components and system operation.

The system includes a preconfigured database for generation of the simulation and can also be configured to base the simulation on other databases such as industrial controller configuration databases and user defined databases. The described system and methods provides for simulations that are operationally fast enough to allow many different equipment designs and configurations to run before selecting final design specifications. In another aspect, the system and methods simulate both mechanical and control behaviors allowing for a more complete simulation leading to a better system design for the actual implementation.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
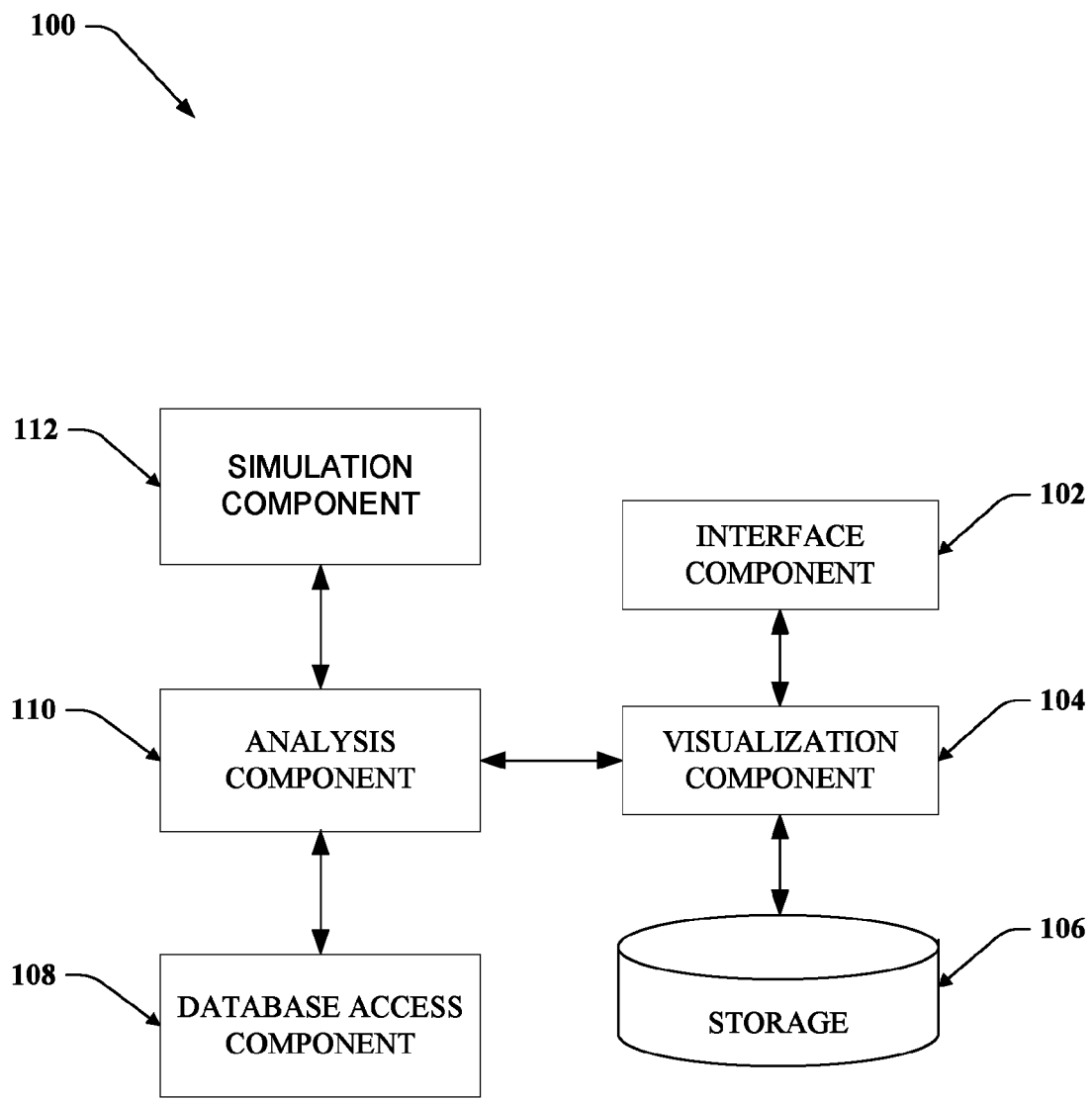
FIG. 1 illustrates an embodiment of a visualization system for simulating the tuning effects of a servo driven mechatronic system.

Systems and methods are provided enabling the user to configure a servo driven mechatronic system allowing the user to select hardware components and operating conditions from a database and simulate the operation of the servo driven mechatronic system. The simulation and analysis can information can then be used to design a servo driven mechatronic system that meets the system requirements with a minimal amount of lead time and expense. The user can also select a preconfigured servo driven mechatronic systems as a basis for designing their intended system. The created servo driven mechatronic systems can be communicatively distributed to data servers or other servo driven mechatronic systems to provide a larger database of possible preconfigured process problem solutions.

In one aspect of the subject disclosure, the preconfigured database represents the accumulation of servo driven system knowledge collected from empirical system operation and control system databases. In another aspect of the subject disclosure, as the servo driven mechatronic systems require change, the simulation system provides for a method of evaluating new equipment before it is purchased and added to the system.

It is noted that as used in this application, terms such as "component," "display," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith. Additionally, it is noted that as used in this application, terms such as "system user," "user," "operator" and the like are intended to refer to the person operating the computer-related entity referenced above.

As used herein, the term to "infer" or "inference" refer generally to the process of reasoning about or inferring states of the system, environment, user, and/or intent from a set of observations as captured via events and/or data. Captured data and events can include user data, device data, environment data, data from sensors, sensor data, application data, implicit and explicit data, etc. Inference can be employed to identify a specific context or action, or can generate a probability distribution over states, for example. The inference can be probabilistic, that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is also noted that the interfaces described herein can include a Graphical User Interface (GUI) to interact with the various components for providing industrial control information to users. This can include substantially any type of application that sends, retrieves, processes, and/or manipulates factory input data, receives, displays, formats, and/or communicates output data, and/or facilitates operation of the enterprise. For example, such interfaces can also be associated with an engine, editor tool or web browser although other type applications can be utilized. The GUI can include a display having one or more display objects (not shown) including such aspects as configurable icons, buttons, sliders, input boxes, selection options, menus, tabs and so forth having multiple configurable dimensions, shapes, colors, text, data and sounds to facilitate operations with the interfaces. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI.

Additionally, it is also noted that the term industrial controller as used herein includes both PLCs and process controllers from distributed control systems and can include functionality that can be shared across multiple components, systems, and or networks. One or more industrial controllers can communicate and cooperate with various network devices across a network. This can include substantially any type of control, communications module, computer, I/O device, Human Machine Interface (HMI)) that communicate via the network which includes control, automation, and/or public networks. The industrial controller can also communicate to and control various other devices such as Input/Output modules including Analog, Digital, Programmed/Intelligent I/O modules, other programmable controllers, communications modules, and the like. The network (not shown) can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Referring initially to FIG. 1, a servo driven mechatronic visualization system 100 for analyzing the selected components and simulating the operation of the servo driven mechatronic system is depicted. The system provides a mechanism to design and test a servo driven mechatronic system without the costly expense of prototyping the system or the lengthy lead time to configure a generalized simulation software package to investigate whether the selected components are operationally acceptable and compatible.

It is contemplated that the servo driven mechatronic visualization system 100 can form at least part of a system development visualization system, but is not limited thereto. For example, the servo driven mechatronic visualization system 100 can be employed to facilitate creating a servo driven mechatronic system related to automation control systems, devices, and/or associated equipment (collectively referred to herein as an automation device(s)) forming part of a production environment. Servo driven mechatronic system 100 includes interface component 102, visualization component 104, storage component 106, database access component 108, analysis component 110 and simulation component 112.

The interface component 102 is communicatively connected to Input/Output devices. The interface component 102 provides for object or information selection, input can correspond to entry or modification of data. Such input can affect the configuration, graphic display, reports and/or automation devices. For instance, a user can select a motion application from the list of previously created applications or he can instruct the servo driven mechatronic visualization system 100 to create a new application. Additionally or alternatively, a user could modify axis parameters such as load type or actuator type. By way of example and not limitation, the user could select a transmission by selecting the transmission type, and entering the ratio of transfer, the effective inertia, the efficiency with regards to torque-dependent losses and the friction torque. It should be noted that input need not come solely from a user, it can also be provided by an automatic model computation based on information in a database related to the selected transmission type.

The interface component 102 receives input concerning displayed objects and information. Interface component 102 can receive input from a user, where user input can correspond to object identification, selection and/or interaction therewith. Various identification mechanisms can be employed. For example, user input can be based on positioning and/or clicking of a mouse, stylus, or trackball, and/or depression of keys on a keyboard or keypad with respect to displayed information. Furthermore, the display device may be by a touch screen device such that identification can be made based on touching a graphical object. Other input devices are also contemplated including but not limited to gesture detection mechanisms (e.g., pointing, gazing . . . ) and voice recognition.

The visualization component 104 presents the configuration screens to the user for selecting the components of the servo driven mechatronic visualization system 100. One or more of the configuration displays contain data entry fields, buttons, check boxes or dropdown menus for selecting components and their associated configuration parameters. For example, the display graphic can have a section labeled "Voltage Selection" for the operator to configure the supply type, the voltage type and the nominal voltage. In another example, the user can configure the load data by entering the mass, the external force and the coefficient of friction related to the load and table mass. Additionally, the user can select an inclination depicting the path of travel of the load.

The storage component 106 provides the ability to archive preconfigured process motion application solutions, preconfigured servo driven mechatronic visualization systems including displays, reports and graphs and user configured components of the visualization system 100. Additionally, any databases created by the user are archived on the storage component and can be communicated to server data stores 1230 or other servo driven mechatronic visualization system clients 1310.

In another aspect, servo driven mechatronic application data is maintained on the storage component 106 for future review with regards to creating new preconfigured servo driven mechatronic systems 100 or updating existing servo driven mechatronic systems 100. The storage component 106 can automatically transfer its database of preconfigured servo driven mechatronic systems 100 to other server data stores based on a timed schedule an event such as the selection of similar components at another servo driven mechatronic system. For example, if a user configures a parameter associated with a particular transmission type and archives the application model to the storage database 106, the servo driven mechatronic system 100 can automatically update all other servo driven mechatronic systems containing the preconfigured transmission as a default selection. In this manner, the efficiency of the overall servo driven mechatronic system design is improved because better default choices are available. If the particular transmission is selected at another location then the user at that location can select the preconfigured transmission parameters without the time consuming and costly step of analyzing the components.

The database access component 108 provides methods and functionality allowing the user access preconfigured motion component databases and user configured motion component databases. In one aspect, the preconfigured motion databases allow the user to select standard commercially available components for use in an analysis and simulation. In another aspect of the subject innovation, the user can create databases containing custom designed components for use in selecting components for the analysis and simulation. In another aspect, the database access component allows the user to select preconfigured or user configured databases from other servo driven mechatronic systems communicatively connected with the user's system.

The analysis component 110 provides the user the ability to analyze the data generated by the simulation. The analysis component presents information important to selecting the components of the servo driven mechatronic system 100. For example, this information includes motor parameters such as but not limited to inertia ratio, peak torque and temperature rise. In another example, the information includes drive parameters such as but not limited to average amperes, peak amperes and bus volts.

In another aspect, the user can make changes to the parameters associated with the selected components and perform another analysis based on the changes in the configuration. This method results in the generation of different solutions for the design of the intended servo driven mechatronic system. After generating the different solutions the user can review the analysis of each solution and select the best solution and therefore the best components for the intended application.

The simulation component 112 provides the user the ability to simulate the running of the servo driven mechatronic system based on the selected components and configuration parameters. In another aspect, the simulation component 112 interacts with a database from a motion controller providing the user the ability to tune the selected components and their associated parameters to optimal conditions based on the information provided by the databases.

Figure 2:
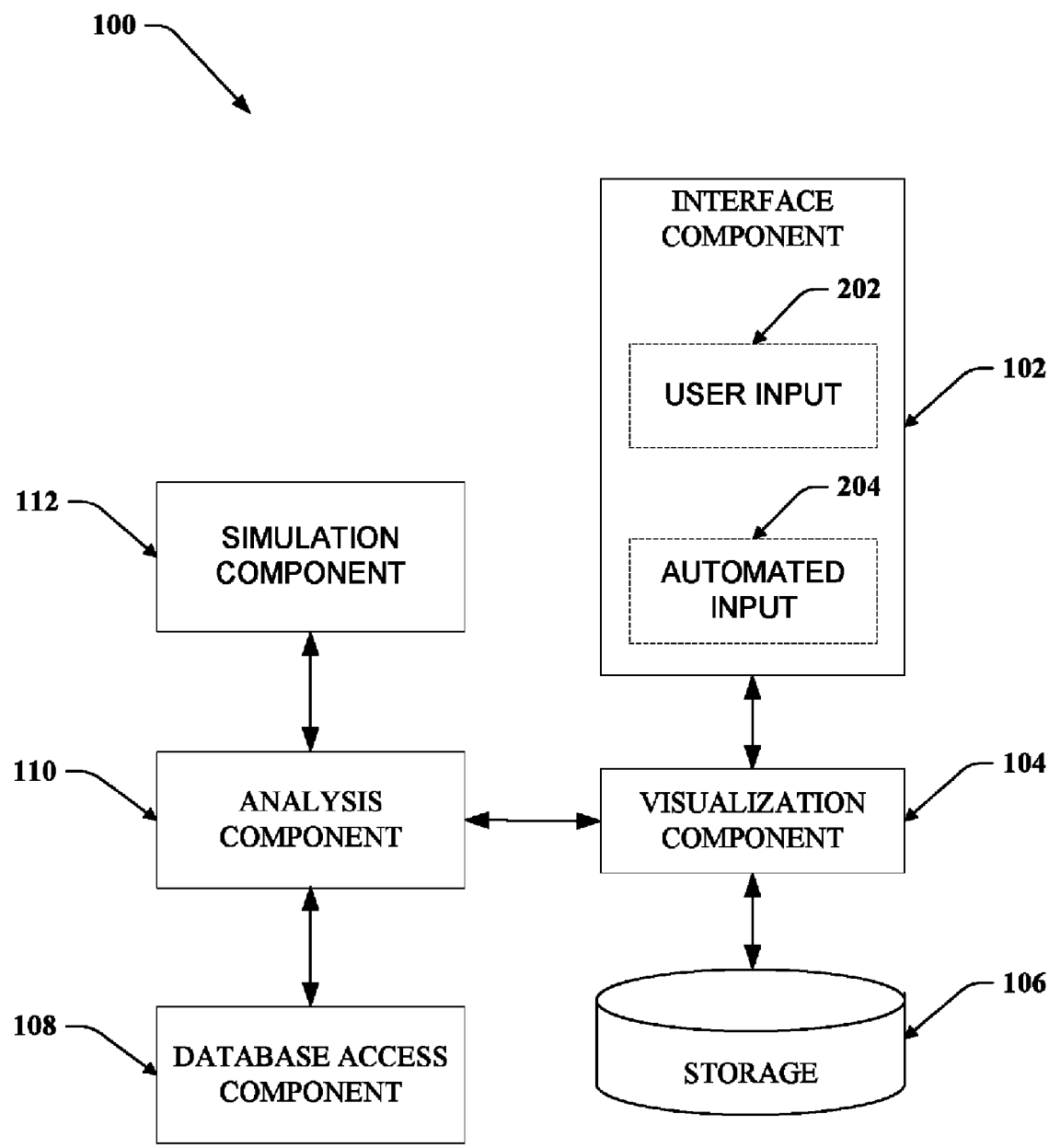
FIG. 2 illustrates an embodiment of a visualization system for simulating the tuning effects of a servo driven mechatronic system where an interface component allows the collection of automated data and manual data.

Referring next to FIG. 2, the interface component 102 includes user input component 202 and automated input component 204. In one aspect, user input component 202 provides the capability for a user to input manual data to select and configure a servo driven mechatronic system. The user can add this information manually with the input devices such as but not limited to a keyboard and mouse. For example, the user can add an actuator type mechanism component to the servo driven mechatronic system including the initial specification of parameters such as actuator type, pinion pitch circle diameter, pinion inertia, losses and table mass. At a later time, when simulations have provided initial information, the user, using the user input component 202, can add additional information or comments to the servo driven mechatronic system to further tune the servo driven mechatronic system or extend the solution to other aspects or machines of the process. The enhanced solution can then be communicated to other servers or servo driven mechatronic systems to decrease overall design time by providing greater insight into the servo driven mechatronic system.

In another aspect, the automated input component 204 provides the user the ability to automatically import motion application data. For example, the user can instruct the servo driven mechatronic system to import axis data. The user can choose to import the selected axis data into the currently displayed motion application or into another motion application defined on the servo driven mechatronic system. In another aspect of the subject innovation, if the selected motion application has more than one axis defined, the user can select the particular axis for application of the imported data.

Figure 3:
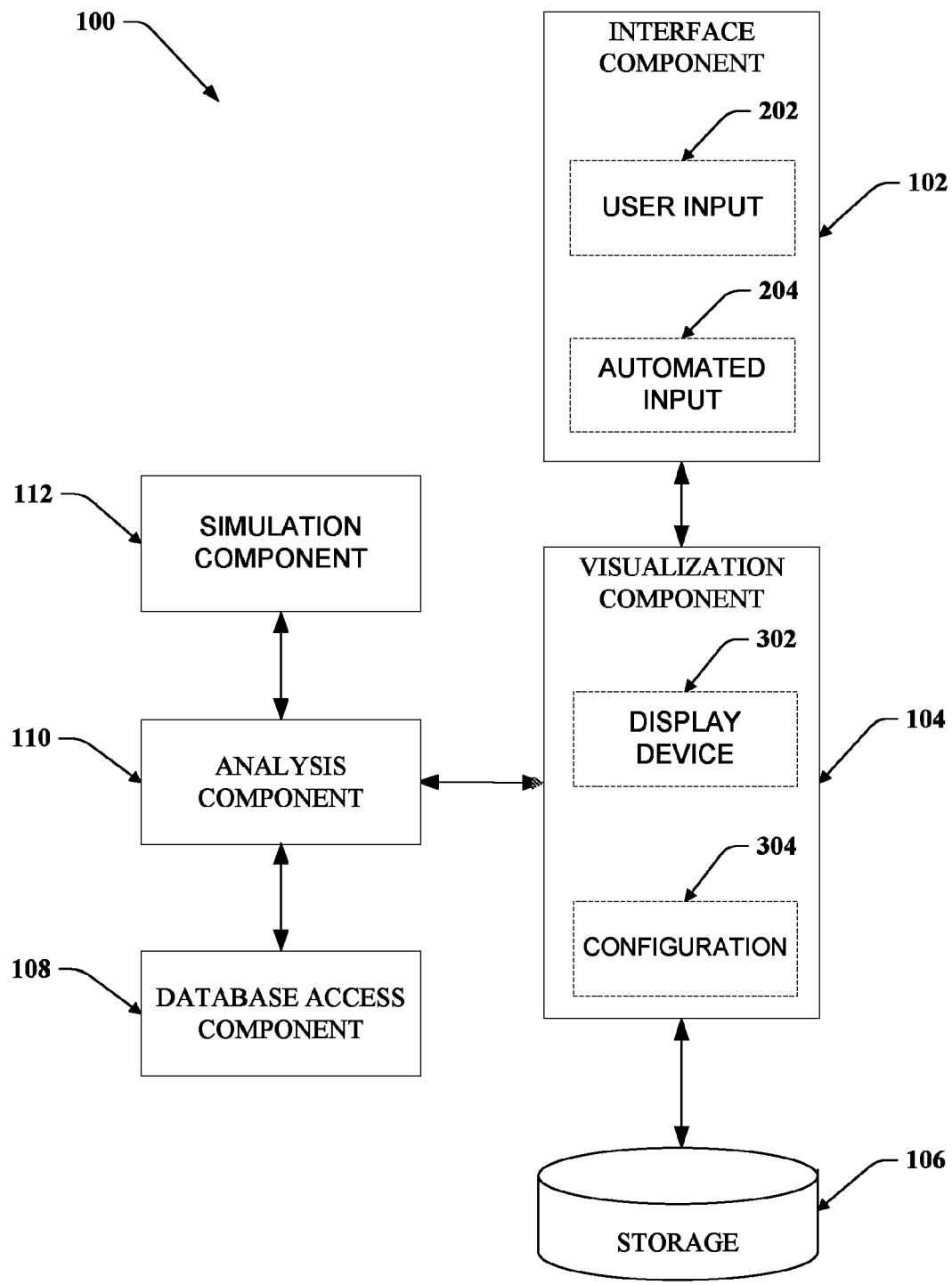
FIG. 3 illustrates an embodiment of a visualization system for simulating the tuning effects of a servo driven mechatronic system where a visualization component allows the selection, configuration and display of servo driven mechatronic system components.

Referring next to FIG. 3, the visualization component 104 includes a display device component 302 and a configuration component 304. In one aspect, the display device component 302 provides a device for rendering a graphic image allowing the operator to monitor the simulation and analysis. A part of the graphic image menus and data entry fields for selecting servo driven mechatronic system components and entering configuration data.

The servo driven mechatronic system also provides the user the ability to create and manage a plurality of motion applications on the current system or on network servers or other servo driven mechatronic systems communicatively connected to the current system. It should be noted that the user can manually transfer the motion applications to or from another servo driven mechatronic system or server or the servo driven mechatronic system can automatically transfer the motion applications to other servo driven mechatronic systems or servers based on events such as but not limited to a user changing some aspect of a motion application.

In another aspect, the configuration component 304 provides for exporting motion applications to different formats for use by other software applications. For example, the motion application can be exported to a delimited text file of the user's configuration or to a document in a word processor format. It should be noted that the described formats are exemplary and other formats are possible based on the user's indication.

Configuration component 304 can also allow the configuration of a motion application based on predefined templates. The predefined templates can be categorized as standard templates such as but not limited to press roll feed and cutter knife drive or as advanced templates such as but not limited to crank and four-bar linkage. These templates provide a starting point for creating motion applications associated with typical motion operations. The templates can then be customized by the user to meet the user's specific motion application. Upon completion, the user can create new templates based on the final configuration thus creating a more accurate starting point for future simulation applications.

Figure 4:
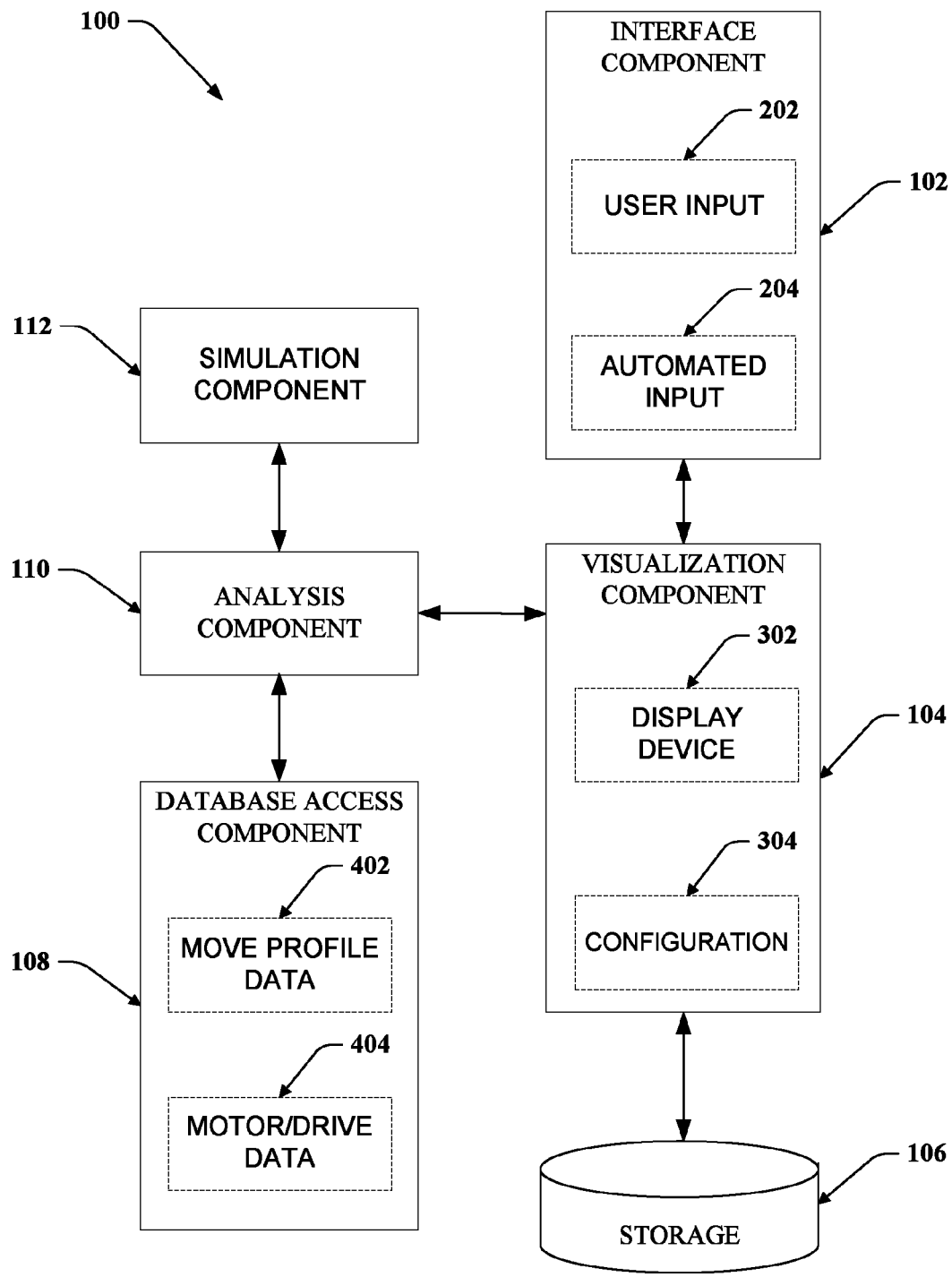
FIG. 4 illustrates an embodiment of a visualization system for simulating the tuning effects of a servo driven mechatronic system where a database access component allows the selection and searching of system and user databases.

Returning to the FIG. 4 of the drawings, the database access component 108 includes move profile data component 402 and motor/drive data component 404. The database access component 108 provides the user the ability to interact with databases containing the information necessary to conduct a simulation of the selected components and perform an analysis based on the results of the simulation. In one aspect of the subject innovation, the database access component 108 allows the user to interact with databases associated with commercially available motors, drives, gearboxes and shunts. In another aspect of the subject innovation, the database access component 108 provides the user the ability to create custom designed motor databases for use in conducting simulations of the selected components.

The move profile data component 402 provides the user access to the data associated with the movement characteristics of the selected drives, motors, actuators, transmissions and resistive brake modules, for any of the specified components included in the simulation application. The use of this data provides the simulator the characteristic information of the components allowing the simulator the ability to calculate the behavior of the configured system and generate the data necessary to analyze the configured system to tune the components for optimal operation.

The motor/drive data component 404 provides the user access to the data associated with the configuration and operational requirements of the selected drives and motors. This data includes but is not limited to supply type, voltage type, nominal voltage, voltage tolerances, transmission type, transmission inertia, transmission ratio, transmission efficiency etc. As described previously, the use of this data provides the simulator the characteristic information of the components allowing the simulator the ability to calculate the behavior of the configured system and generate the data necessary to analyze the configured system to tune the components for optimal operation.

Figure 5:
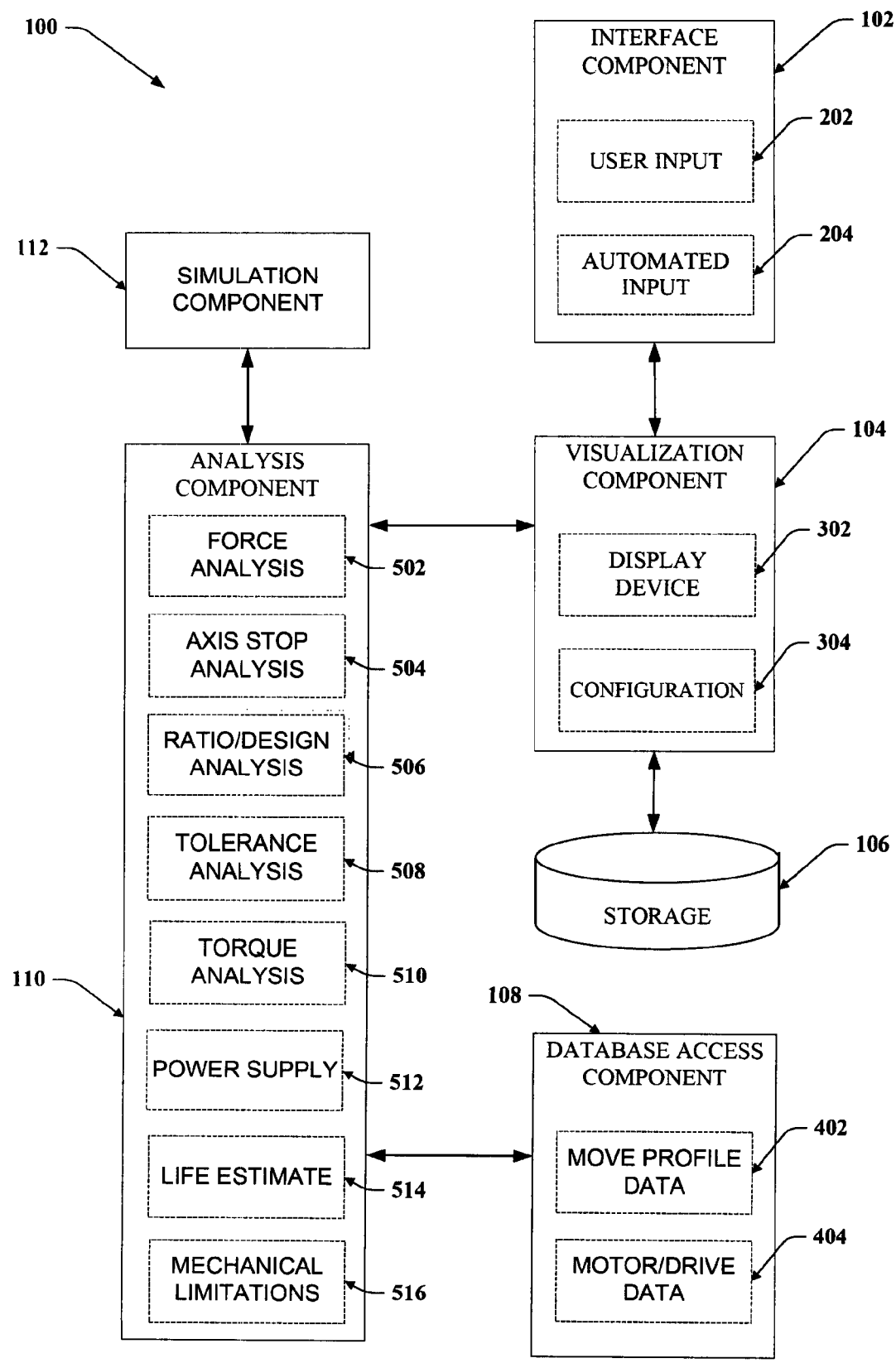
FIG. 5 illustrates an embodiment of a visualization system for simulating the tuning effects of a servo driven mechatronic system where an analysis component allows the selection, configuration and analysis of equipment and configuration associated with a servo driven mechatronic system.

Referring now to FIG. 5, the analysis component 110 includes a force analysis component 502, an axis stop analysis component 504, a ratio/design analysis component 506, a tolerance analysis component 508, a torque analysis component 510, a power supply component 512, mechanical limitations component 516 and a life estimate component 514. In another aspect of the subject innovation, the force analysis component 502 provides the user the ability to determine the order of the segments with regards to peak force. This analysis directs the user to the appropriate segment for consideration of design changes that will have the greatest impact on servo driven mechatronic system efficiency of operation. If the user chooses, the other segments can be reviewed and are presented to the user in order of descending peak force.

In another aspect of the subject innovation, the axis stop component 504 presents the user a graphical analysis and options for using a drive controlled stop or a resistive brake module. In one aspect of the axis stop component 504, the user is presented a graphical representation of the deceleration time and distance required based on a controlled stop by the drive. In another aspect of the axis stop component 504, the user can select to analyze a resistive brake module by providing a start velocity based on a maximum application or maximum motor velocity and load data for the servo driven mechatronic system. The results of the selection are presented to the user in a graphical format is feasible, if not feasible then the user receives a message about what parameters to change to allow the use of a resistive brake module.

In another aspect of the subject innovation, the ratio/design analysis component 506 provides the user the ability to investigate the effect of transmission ratio on servo driven mechatronic system performance and to quickly choose an optimum performance ratio. In one aspect the user is presented with a graphical representation of the gearbox ratio versus the percentage utilization. The user can then vary the gearbox ratio and observe the effect the variance of the gearbox ratio has with respect to percent utilization. In another aspect the subject innovation, the ratio/design analysis component 506 provides the user a list of available gearboxes for selection for use in the analysis. The user can then choose other gearboxes and vary the gearbox ratio to further identify the optimal components to include in the servo driven mechatronic system design.

The tolerance analysis component 508, in another aspect of the subject innovation, provides the user the ability to configure tolerance bands for any servo driven mechatronic system variables used in the analysis. These tolerance bands are evaluated as both ranges for input and determining if a particular application is marginal in its design.

In one aspect of the tolerance analysis component 508, the servo driven mechatronic system allows the user to configure a tolerance analysis for the load with regards to parameters such as load mass, load thrust, load inclination and temperature. The user can configure a low and high value for each of these parameters and a number of steps between the low and high values. In another aspect of the tolerance analysis component 508, the servo driven mechatronic system allows the user to select an element of the velocity profile, configure its tolerance parameters and display the effect on the profile of the newly configured parameters. In another aspect of the tolerance analysis component 508, the user can configure a tolerance analysis for the actuator with regards to inertia, diameter, belt mass, table mass, losses, temperature and the coefficient of friction. The user can configure a low and high value for each of these parameters and a number of steps between the low and high values.

In another aspect of the subject innovation, the torque analysis component 510 provides the user the ability to determine the order of the segments with regards to peak torque. This analysis directs the user to the appropriate segment for consideration of design changes that will have the greatest impact on servo driven mechatronic system efficiency of operation. If the user chooses, the other segments can be reviewed and are presented to the user in order of descending peak torque.

In one aspect, the power supply component 512 allows the user to select system modules for multi axis servo driven mechatronic systems. In another aspect, the power supply component 512 allows the user to select the phase relationship between the various axis profiles allowing optimization or limiting of the current draw for the servo driven mechatronic system.

In another aspect of the power supply component 512, the user can select power modules and shunts. The power modules and shunts can be selected manually or automatically depending on the user's knowledge or desire to explicitly control the selection. The analysis provides the user detailed analysis of the servo driven mechatronic system activity in terms of bus volts and system current in addition to providing the capability to simulate changes to the system parameters. In another aspect, the power supply component 512 of the servo driven mechatronic system allows the user to specify the time slice interval for the analysis display allowing the user to more accurately tune the servo driven mechatronic system as the design evolves towards a final configuration. In another aspect of the power supply component 512, an energy saving estimator presents the user with the cost savings of using the servo driven mechatronic system as designed and configured.

In another aspect of the subject innovation, the life estimate component 514 provides the user the ability to estimate the L10 lives of bearings and seals associated with the equipment components selected for the servo driven mechatronic system. The user is presented with graphic displays for inputting operating condition data. The input data includes but is not limited to axial load, radial load, hours of operation per day, days of operation per week and weeks of operation per year. The servo driven mechatronic system then calculates the shaft bearing L10 life estimates and the shaft load ratings. It should be noted that the life estimate calculations can be performed on gear motors, actuators, linear stages or other equipment components.

Figure 6:
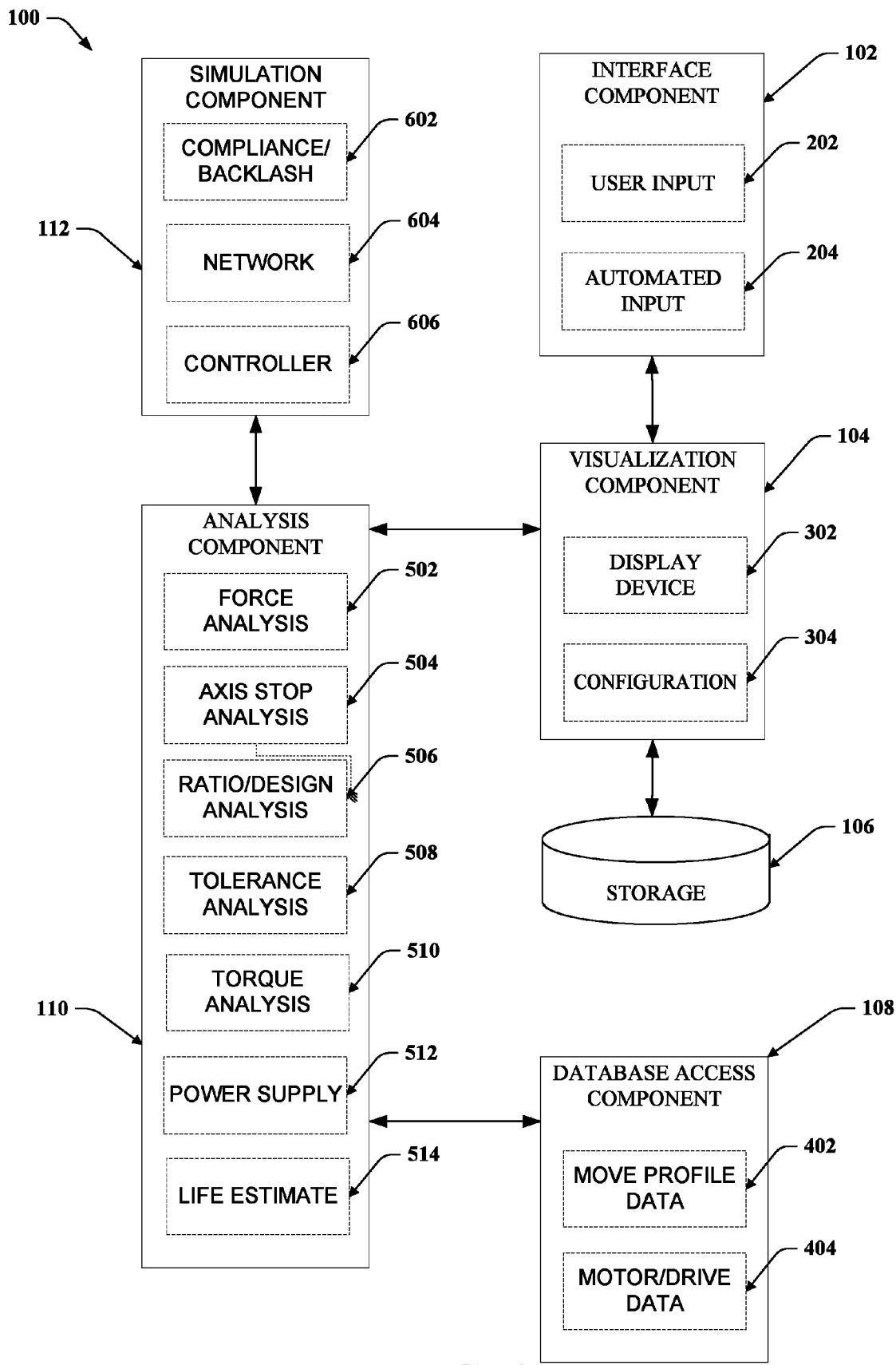
FIG. 6 illustrates an embodiment of a visualization system for simulating the tuning effects of a servo driven mechatronic system where a simulation component allows the visualization system to present a model of the servo driven mechatronic system in operation.

Referring now to FIG. 6, the simulation component 112 includes a compliance/backlash component 602, a network component 604 and a controller component 606. The simulation component 112 provides the capability to run the user's configured servo driven mechatronic system as a simulation and collect data useful in analyzing the feasibility, efficiency and stability of the mechatronic system based on the component selection. In one aspect, the compliance/backlash component 602 provides the user with a mechanism to manually enter data for the compliance of the mechatronic system components and backlash data associated with the gearbox. In another aspect, the compliance/backlash component 112 can automatically include backlash data for the gearbox from the database in place of or in addition to the manual data provided by the user. The inclusion of compliance and backlash data allows the compliance/backlash component 602 in concert with the simulation component 112 to calculate any predicted resonance characteristics of the mechatronic system. In many applications these constraints will provide the limits of performance of the mechatronic system.

The network component 604, in another aspect of the subject innovation, provides the user with a mechanism for manually entering network parameters associated with simulating the operation of the mechatronic system. For example, the user can enter the network update allowing the network component 604 to predict the behavior of the mechatronic system between data samples. The user can adjust the entered update rate value in the simulator and run additional simulations to determine if another network update rate would lead to a mechatronic system with greater stability for the selected components.

In another aspect of the subject innovation, in combination with the user's manually entered data, the network component 604 can automatically select network model parameters from the mechatronic system database. The data provided from the database allows the network component 604 to fine tune the simulation to make a better estimate of the characteristics of the mechatronic system because of the ability to determine the impact of the identified network and its associated parameters on the operation of the components of the mechatronic system. For example, the network component 112 can allow for the lag time between the occurrence of a specific event at one of the mechatronic system components and the notification to the controller of the event. Accordingly, the simulation component 112 prediction of the behavior of the mechatronic system more accurately represents the system based on the selected components.

In another aspect of the subject innovation, the controller component 606 provides the user the ability to simulate the process control loops embedded in the mechatronic system controller. In one aspect, the user can manually enter planner rate data, tuning parameters and other optional data. For example, if the user has experience with the simulated equipment, empirically derived control parameters such as gains and integrals can be manually entered to reduce the simulator iterations required to approach the optimal solution.

Figure 14:
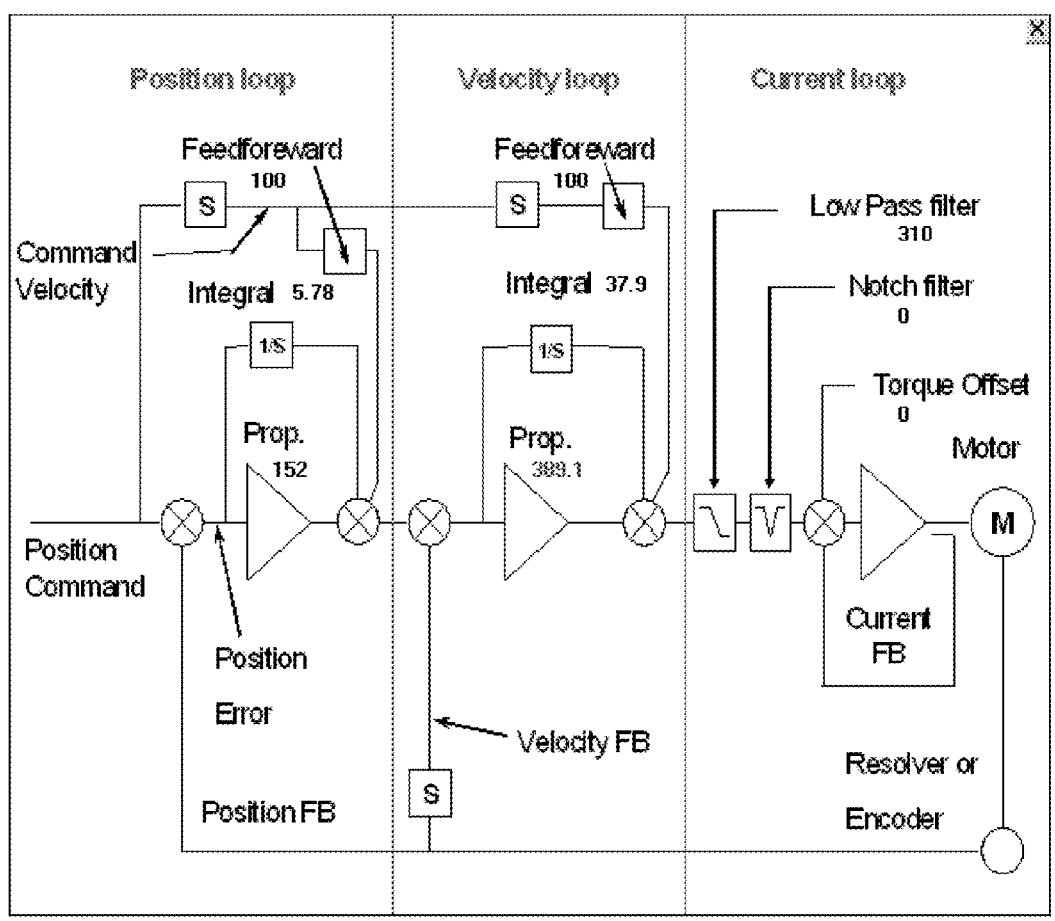
FIG. 14 illustrates an embodiment of the servo driven mechatronic system depicting a cascaded control loop structure.

In another aspect of the subject innovation, the controller component 606 simulates a cascaded control loop structure as illustrated in FIG. 14. A position proportional integral control loop is cascaded into a velocity proportional integral control loop that is cascaded in a current control loop. The initial loop parameters are entered either from the user's manual entry, from an automatic search of the database or from a combination of manual user data and automatic data base search. After each simulation the user can manually change the data entries for each control parameter. In another aspect of the subject innovation, the user can select an automatic control loop tuning function providing the user the ability to allow the simulation component 112 to provide loop parameters based on simulation data. The user can choose to tune an individual parameter or select a plurality of parameters for automatic tuning.

The controller component 606, in another aspect of the subject innovation, can automatically tune different components of the control loops based on the application type. For example, the user can select an application type from basic, constant speed, point to point and tracking. After selecting the application type, the user can select one or more control loop parameters to include in the automatic tuning calculation. For example, the user can select one or more of the parameters of position integral, velocity integral, velocity feedforward, acceleration feedforward, torque offset and output filter. After selecting the desired parameters, the user initiates the automatic control loop tuning calculations and the best parameters are calculated, entered into the data fields and presented to the user. The user can then run a simulation with the calculated parameters and evaluate the performance of the automatically tuned control loop parameters.

Figure 7:
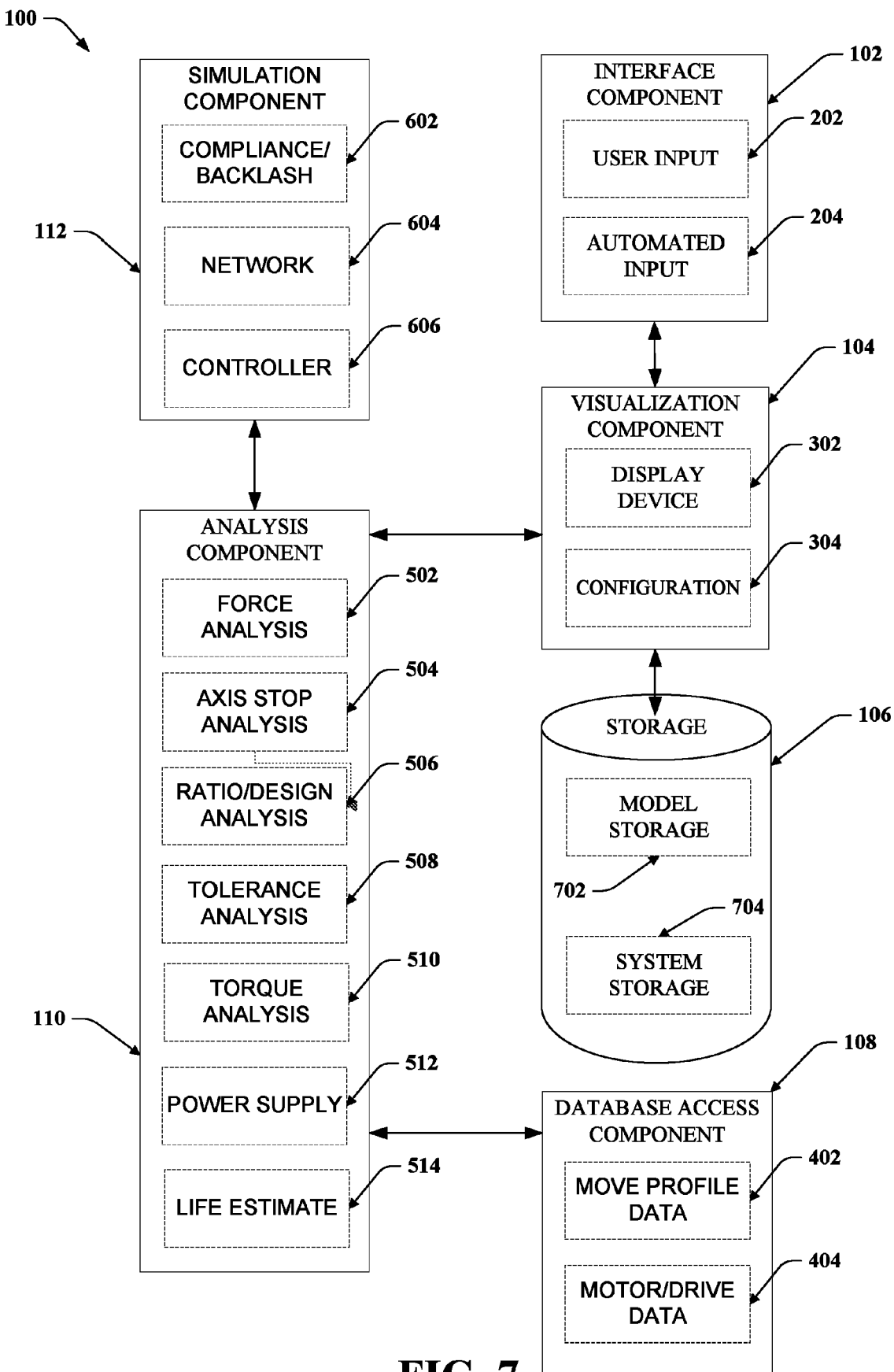
FIG. 7 illustrates an embodiment of a visualization system for simulating the tuning effects of a servo driven mechatronic system where a storage component allows the visualization system to store preconfigured and user databases, simulation models and simulation results.

Referring now to FIG. 7, the storage component 106 includes a model storage component 702 and a system storage component 704. Storage component 106 can be any suitable data storage device (e.g., random access memory, read only memory, hard disk, flash memory, optical memory), relational database, XML, media, system, or combination thereof. The storage component 106 can store information, programs, historical process data and the like in connection with the servo driven mechatronic system 100. In one aspect, the model storage component provides the capability to store a plurality of preconfigured motion application models. The preconfigured motion application models can be organized by any criteria and made available for selection by the user. For example, the user can choose a preconfigured motion application model based on the production line type or on a particular machine operating as part of the production line.

At the users' discretion, new motion application models can be created and stored based on changes to the production line or a particular machine. The operator can also combine multiple motion application models to create a new larger motion application model. For example, the operator can select a press roll feed, template and add a cutter knife drive template. The operator can then modify the default configurations of the templates to match the operator's motion application requirements. The model storage component 702 also allows the preconfigured motion application models to be shared with server data stores 1230 or other servo driven mechatronic systems 100 through any of the communicatively connected systems.

In another aspect, the system storage component 704 provides storage for all the components required to operate the servo driven mechatronic system 100 and the simulation and analysis data collected based on operator invocation of the simulation. As with the preconfigured process problem solution models, the collected simulation and analysis data can be shared among server data stores 1230 or other servo driven mechatronic systems 100. A maintenance system associated with the system storage component 704 provides for automatically backing up changed preconfigured motion application models and simulation and analysis data based on a timed frequency and an indication that the system storage component 604 is reaching full capacity.

Figure 8:
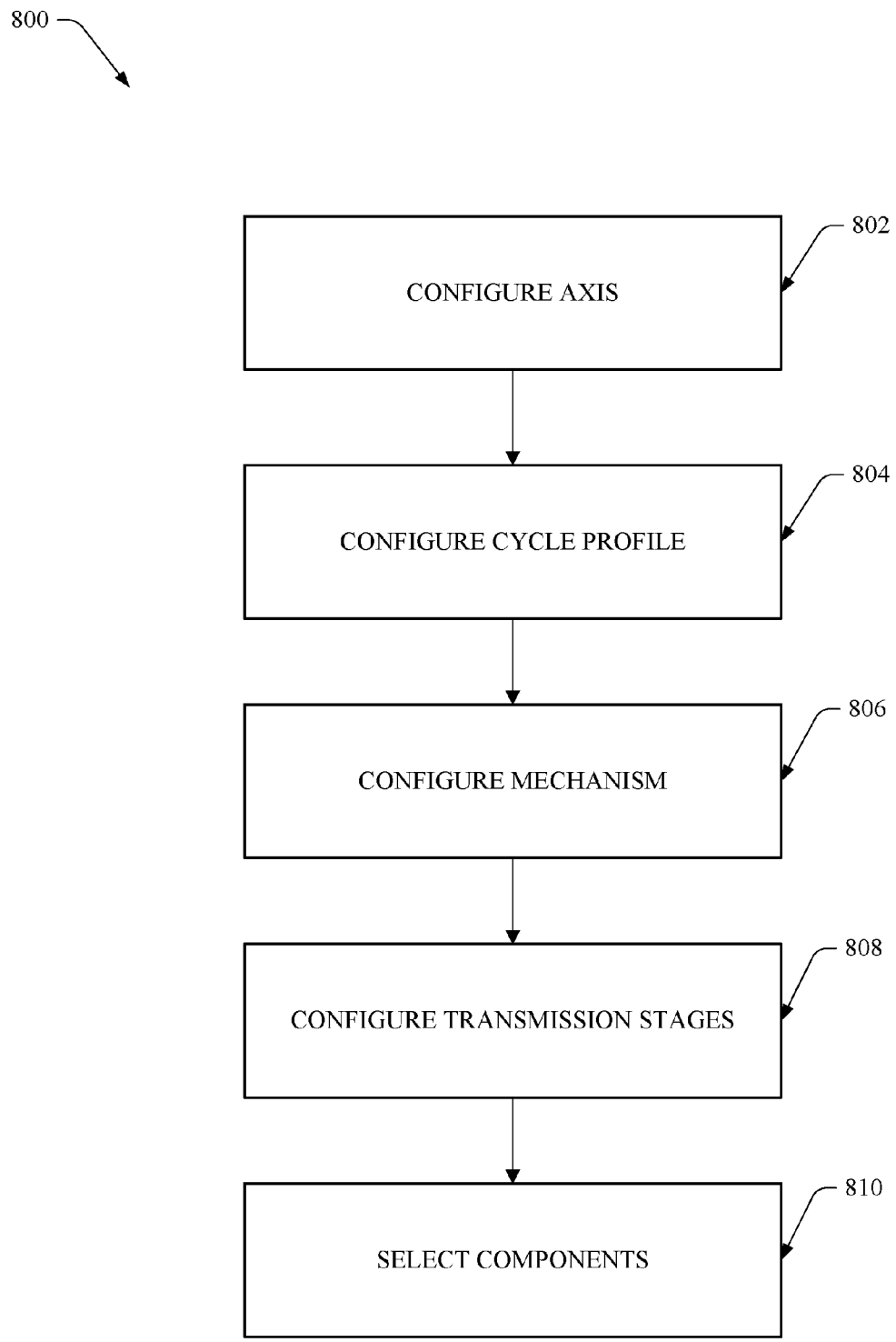
FIG. 8 illustrates a methodology of a servo driven mechatronic system where the user configures the components of the system.

Referring now to FIG. 8, a method 800 of simulating tuning effects of a servo driven mechatronic system is illustrated. In one aspect at 802, the user configures one or more axis of the servo driven mechatronic system. The user is presented graphic screens for entering selections including but not limited to load type and actuator type. In addition, the user can make a voltage selection including but not limited to supply type, voltage type, nominal voltage and voltage tolerances. In another aspect the user can enter a user defined name for the axis and provide parameters associated with the motor and/or drive of maximum ambient temperature and altitude.

In another aspect at 804 of the method 800 of simulating tuning effects of a servo driven mechatronic system, the user configures cycle profile data by first selecting a cycle profile mode. The cycle profile mode includes but is not limited to selections of indexing and multi-segment. If the user selects an indexing mode then the user is further prompted by graphical displays for additional input such as but not limited to motion parameters of move distance, move time, and dwell time. If the user selects a multi-segment mode then the user is further prompted by graphical displays for additional input such as but not limited to initial velocity, final velocity, distance, time, acceleration/deceleration, external force and payload mass for each segment.

In another aspect of the subject innovation illustrated at 806 of the method 800 of simulating tuning effects of a servo driven mechatronic system, the user is presented a graphical display for entering the mechanism load data such as but not limited to the load mass of the entire profile, the external force applied to the entire load mass, the coefficient of friction associated with the load mass and the table mass and the inclination of the path the mass must travel. In another aspect of the step 806, the user must enter the actuator type associated with the mechanism. The actuator type can be but is not limited to belt drive, lead screw, chain and sprocket and rack and pinion. If the user selects belt drive then another graphical displays prompts the user for the inertia and diameter of each roller, drive and idler, the table mass, the belt mass and any rotary losses. If the user selects lead screw then another graphical display prompts the user for the distance the load moves per turn of the screw or lead, the inertia of the lead screw, bearings and nut, the torque required to rotate the screw at zero speed or pre-load, the efficiency and the slide mass. If the user selects chain and sprocket then another graphical display prompts the user for the inertia and pitch circle diameter (PCD) of each sprocket, drive and idler, the table mass, the chain mass and any rotary losses. If the user selects rack and pinion then another graphical display prompts the user for the pinion pitch circle diameter, the pinion inertia, the table mass and any rotary losses.

In another aspect of the subject innovation illustrated at 808 of the method 800 of simulating tuning effects of a servo driven mechatronic system 100, the user is presented a graphical display for entering information related to one or more transmissions such as but not limited to a transmission type of belt drive, chain and sprocket, spur gear and coupling. If the user selects belt drive, chain and sprocket or spur gear then another graphical display prompts the user for the transmission ratio, inertia, efficiency and frictional torque. If the user selects coupling, then only the coupling inertia is requested. The user can select as many transmission descriptions as the system requires.

In another aspect of the subject innovation illustrated at 808 of the method 800 of simulating tuning effects of a servo driven mechatronic system, the user is presented a graphical display for selecting the motor and drive based on the previously entered information. The user can choose a motor type with or without a gearbox. If the user chooses a motor without a gearbox then the user must enter the maximum inertia ratio, select one or more motor series from a list of at least AC Spindle Motors, Asynchronous 460 volt servo motors, Asynchronous 400 volt servo motors, liquid cooled servo motors and standard servo motors. If the user selects a motor with a gearbox then the user must also select a gearbox manufacturer, configuration, series and frame.

Figure 9:
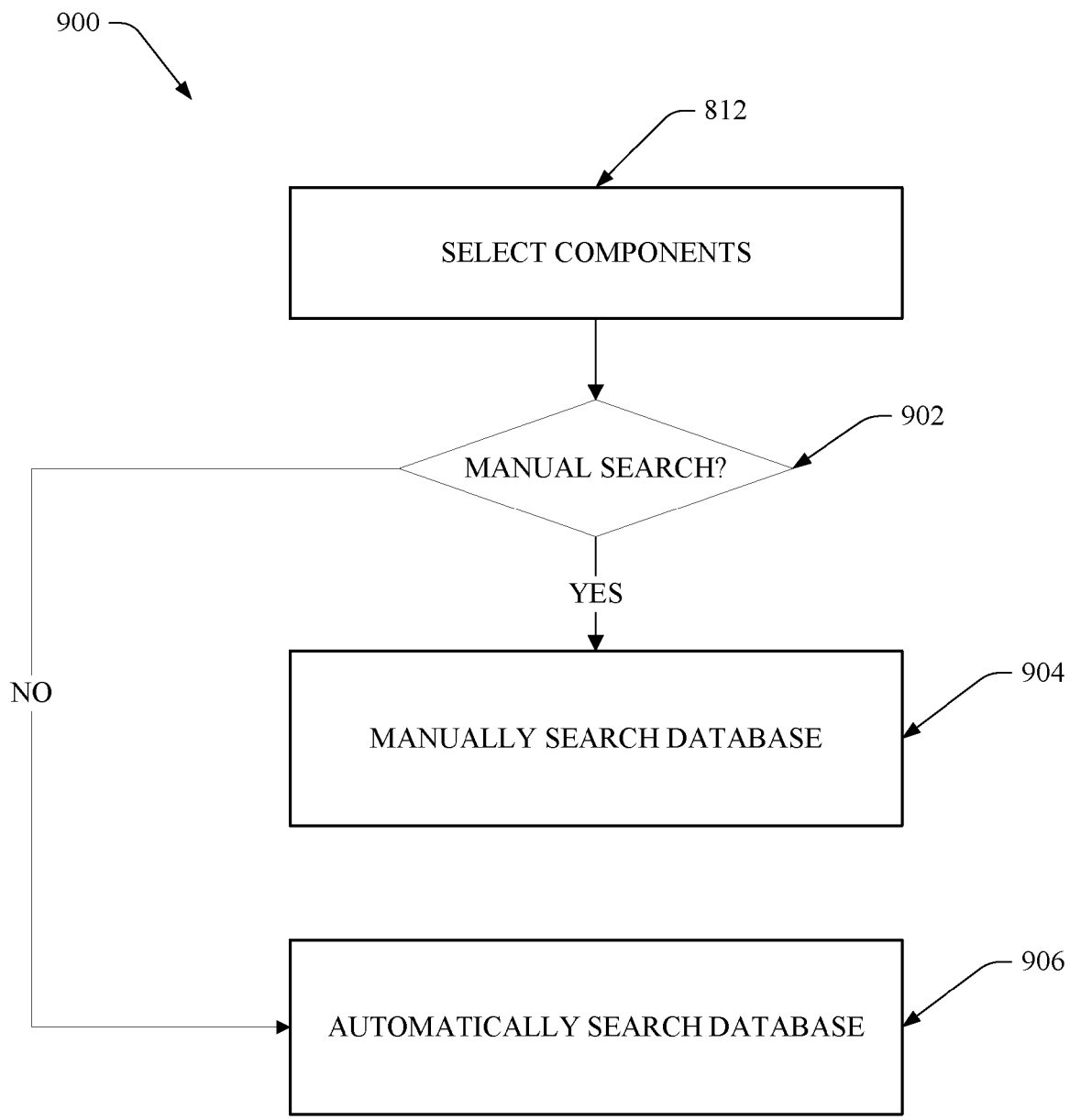
FIG. 9 illustrates a methodology of a servo driven mechatronic system where the user decides on the type of database search to conduct.

Referring now to FIG. 9, a method 900 of simulating tuning effects of a servo driven mechatronic system is illustrated. In one aspect at 902, the user must select whether the intended databases will be searched automatically or manually. If the user selects manually at 904, then the user must select one or more motors and/or drives from the presented list. If the user selects automatically at 906, then the servo driven mechatronic system 100 will present the user with the best motor and drive selection based on the previously entered configuration data for use in the simulation and analysis of the servo driven mechatronic system 100.

Figure 10:
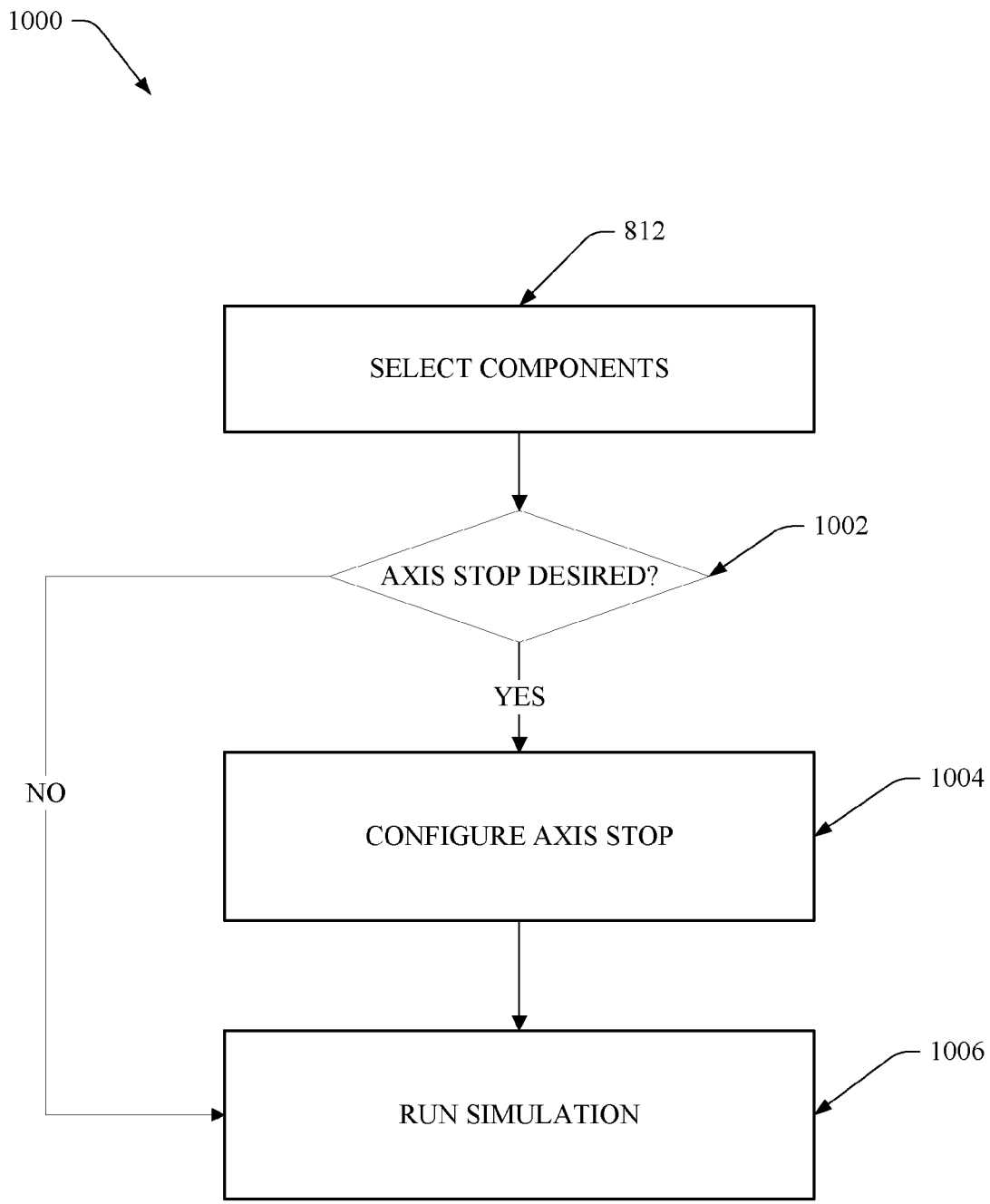
FIG. 10 illustrates a methodology of a servo driven mechatronic system where the user decides whether to include an axis stop component before running the simulation.

Referring now to FIG. 10, a method 1000 illustrates configuring a servo driven mechatronic system 100 to include an axis stop before running a simulation and analysis. The user is presented with a graphical display illustrating the deceleration time and distance based on the drive and power selections. The user can choose to add a resistive brake module at 1002. If the user selects axis stop desired then at 1004 the user is presented with a graphical display for selecting a start velocity based on either the maximum application velocity or the maximum motor velocity. The user can then select the load data as either the mechanism data or a user defined load. The user then instructs the servo driven mechatronic system 100 to select a resistive brake module and the system responds with the appropriate resistive brake module.

Figure 11:
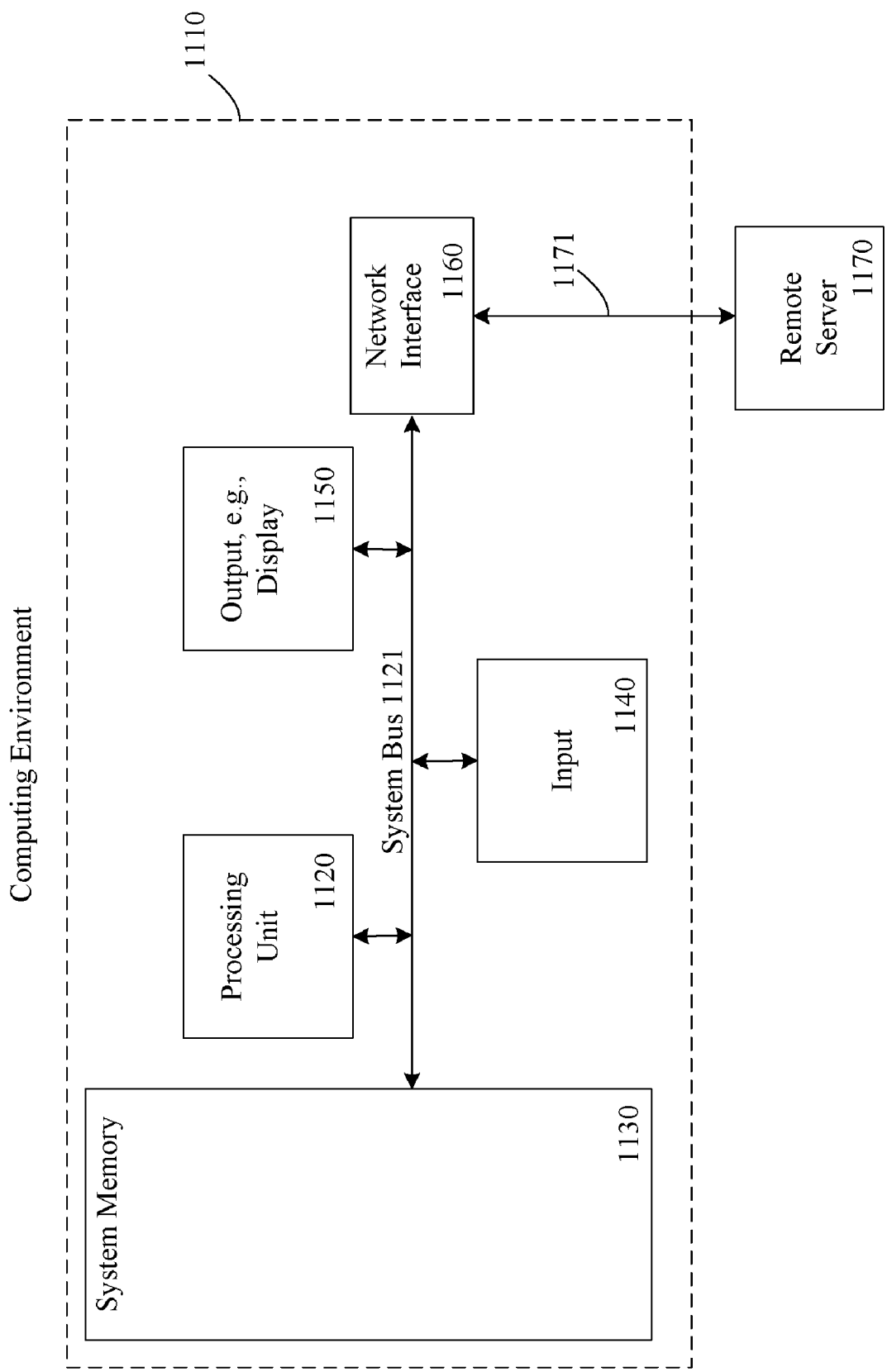
FIG. 11 illustrates an embodiment of the servo driven mechatronic system depicting a typical computing environment.

FIG. 11 thus illustrates an example of a suitable computing system environment 1100 in which the claimed subject matter may be implemented, although as made clear above, the computing system environment 1100 is only one example of a suitable computing environment for a mobile device and is not intended to suggest any limitation as to the scope of use or functionality of the claimed subject matter. Further, the computing environment 1100 is not intended to suggest any dependency or requirement relating to the claimed subject matter and any one or combination of components illustrated in the example operating environment 1100.

With reference to FIG. 11, an example of a remote device for implementing various aspects described herein includes a general purpose computing device in the form of a computer 1110. Components of computer 1110 can include, but are not limited to, a processing unit 1120, a system memory 1130, and a system bus 1121 that couples various system components including the system memory to the processing unit 1120. The system bus 1121 can be any of several types of bus structures including a memory bus or memory controller, a peripheral bus, and a local bus using any of a variety of bus architectures.

Computer 1110 can include a variety of computer readable media. Computer readable media can be any available media that can be accessed by computer 1110. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media can embody computer readable instructions, data structures, program modules or other data in a modulated data signal such as a carrier wave or other transport mechanism and can include any suitable information delivery media.

The system memory 1130 can include computer storage media in the form of volatile and/or nonvolatile memory such as read only memory (ROM) and/or random access memory (RAM). A basic input/output system (BIOS), containing the basic routines that help to transfer information between elements within computer 1110, such as during start-up, can be stored in memory 1130. Memory 1130 can also contain data and/or program modules that are immediately accessible to and/or presently being operated on by processing unit 1120. By way of non-limiting example, memory 1130 can also include an operating system, application programs, other program modules, and program data.

The computer 1110 can also include other removable/non-removable, volatile/nonvolatile computer storage media. For example, computer 1110 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 1221 through a non-removable memory interface such as an interface, and a magnetic disk drive or optical disk drive can be connected to the system bus 1121 by a removable memory interface, such as an interface.

A user can enter commands and information into the computer 1110 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 1120 through user input 1140 and associated interface(s) that are coupled to the system bus 1121, but can be connected by other interface and bus structures, such as a parallel port, game port or a universal serial bus (USB). A graphics subsystem can also be connected to the system bus 1121. In addition, a monitor or other type of display device can be connected to the system bus 1121 via an interface, such as output interface 1150, which can in turn communicate with video memory. In addition to a monitor, computers can also include other peripheral output devices, such as speakers and/or a printer, which can also be connected through output interface 1150.

The computer 1110 can operate in a networked or distributed environment using logical connections to one or more other remote computers, such as remote server 1170, which can in turn have media capabilities different from device 1110. The remote server 1170 can be a personal computer, a server, a router, a network PC, a peer device or other common network node, and/or any other remote media consumption or transmission device, and can include any or all of the elements described above relative to the computer 1110. The logical connections depicted in FIG. 11 include a network 1171, such local area network (LAN) or a wide area network (WAN), but can also include other networks/buses. Such networking environments are commonplace in homes, offices, enterprise-wide computer networks, intranets and the Internet.

When used in a LAN networking environment, the computer 1110 is connected to the LAN 1171 through a network interface or adapter. When used in a WAN networking environment, the computer 1110 can include a communications component, such as a modem, or other means for establishing communications over the WAN, such as the Internet. A communications component, such as a modem, which can be internal or external, can be connected to the system bus 1121 via the user input interface at input 1140 and/or other appropriate mechanism. In a networked environment, program modules depicted relative to the computer 1110, or portions thereof, can be stored in a remote memory storage device. It should be appreciated that the network connections shown and described are exemplary and other means of establishing a communications link between the computers can be used.

Figure 12:
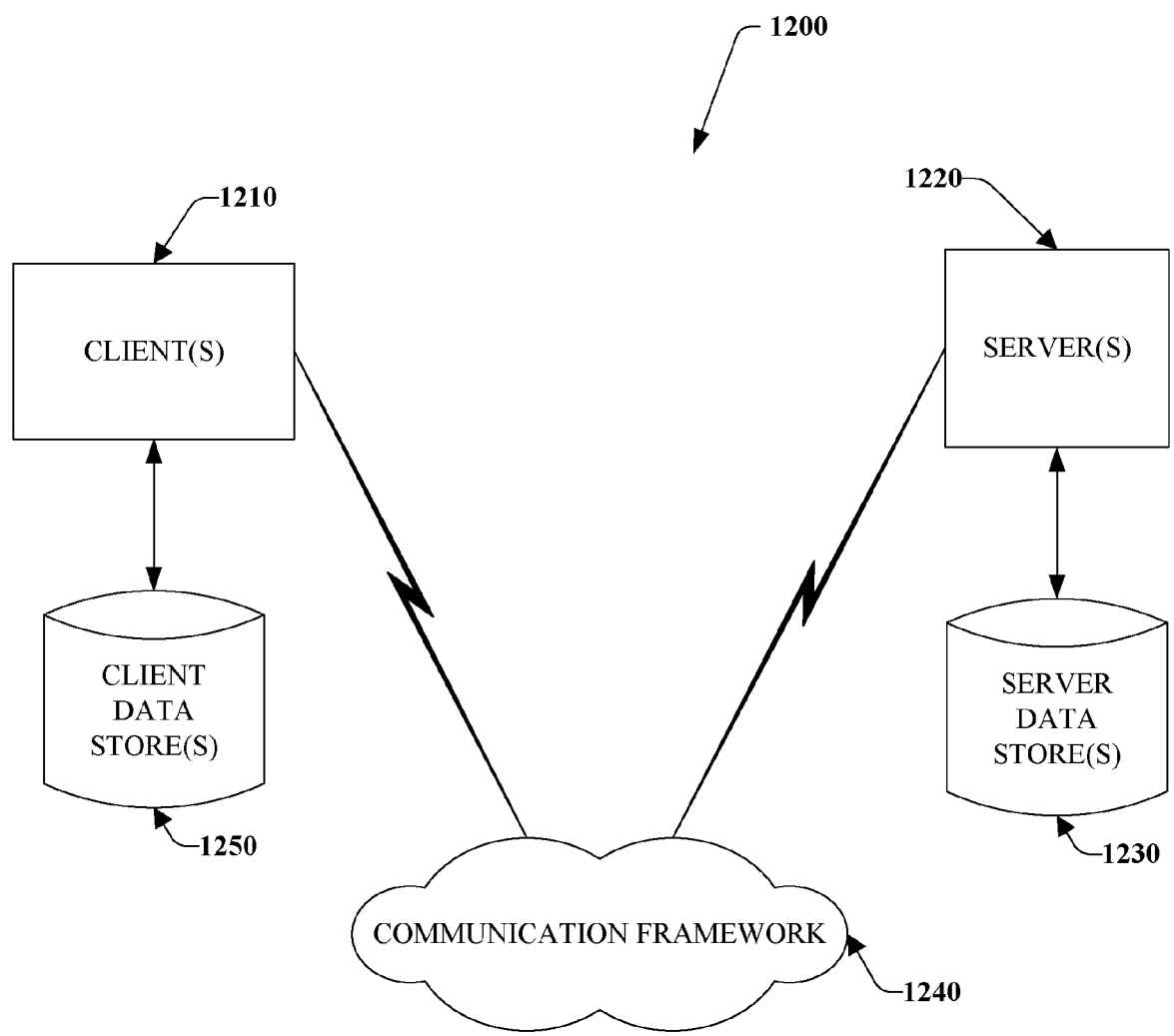
FIG. 12 illustrates an embodiment of the servo driven mechatronic system depicting the interaction between a servo driven mechatronic client and a database server.

FIG. 12 is a schematic block diagram of a sample-computing environment 1200 within which the disclosed and described components and methods can be used. The system 1200 includes one or more client(s) 1210. The client(s) 1210 can include hardware and/or software (for example, threads, processes, computing devices). The system 1200 also includes one or more server(s) 1220. The server(s) 1220 can include hardware and/or software (for example, threads, processes, computing devices). The server(s) 1220 can house threads or processes to perform transformations by employing the disclosed and described components or methods, for example. Specifically, one component that can be implemented on the server 1220 is a security server. Additionally, various other disclosed and discussed components can be implemented on the server 1220.

One possible means of communication between a client 1210 and a server 1220 can be in the form of a data packet adapted to be transmitted between two or more computer processes. The system 1200 includes a communication framework 1240 that can be employed to facilitate communications between the client(s) 1210 and the server(s) 1220. The client(s) 1310 are operably connected to one or more client data store(s) 1250 that can be employed to store information local to the client(s) 1210. Similarly, the server(s) 1220 are operably connected to one or more server data store(s) 1230 that can be employed to store information local to the server(s) 1240.

Figure 13:
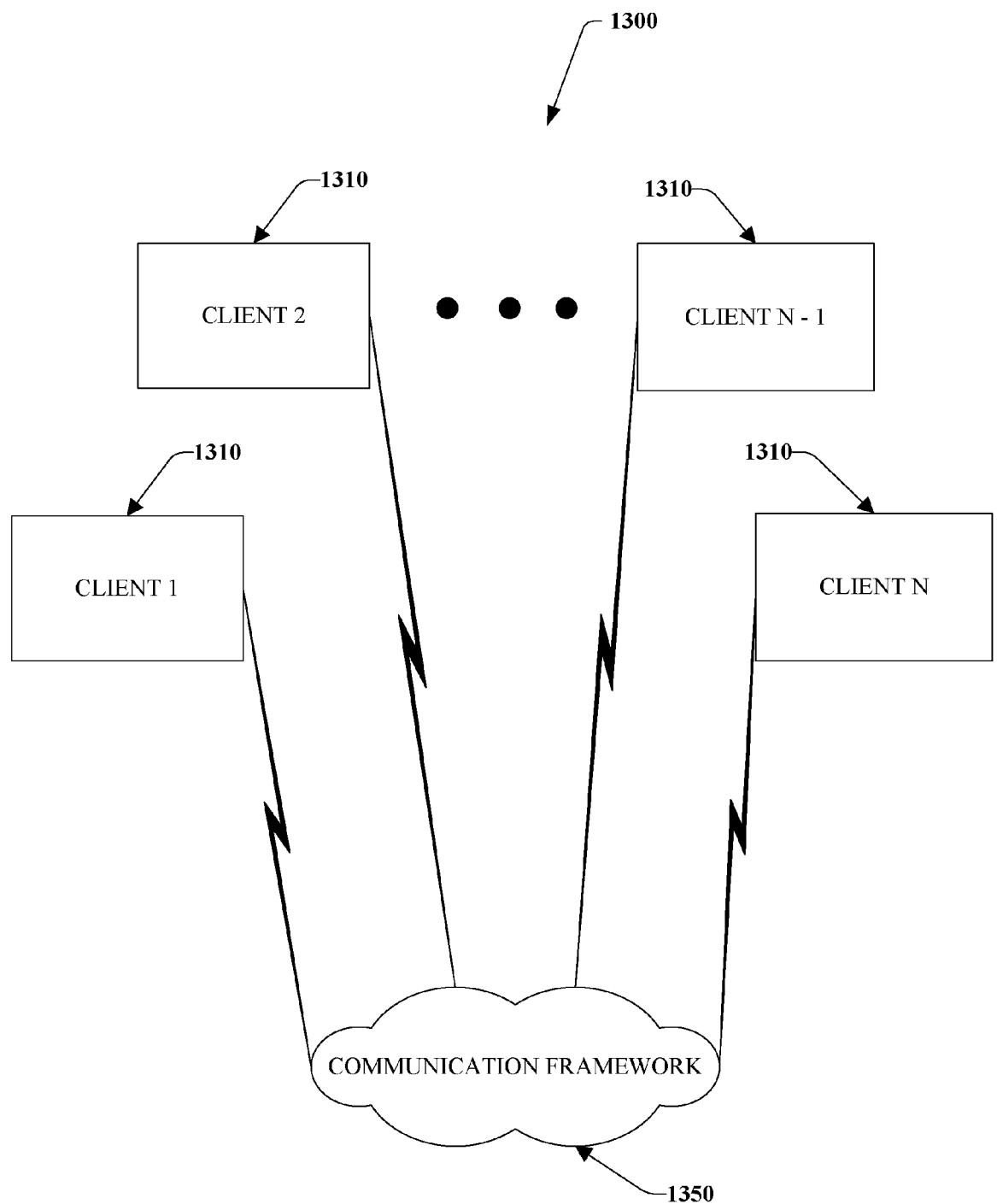
FIG. 13 illustrates an embodiment of the servo driven mechatronic system depicting the interaction between multiple servo driven mechatronic clients.

Referring again to the drawings, FIG. 13 illustrates an embodiment of the subject invention where a plurality of client systems 1310 can operate collaboratively based on their communicative connection. For instance, as described previously, a servo driven mechatronic system 100 can transmit an updated motion application model to a plurality of servo driven mechatronic systems 100 to share the simulation and analysis with others. In another example, the servo driven mechatronic systems 100 can operate in a series fashion, allowing simulation and analysis data received by servo driven mechatronic system 100 client 1 to transmit the information to servo driven mechatronic system 100 client 2 which proceeds to transfer the information to servo driven mechatronic system 100 client N−1 and in a similar fashion transmits the information to servo driven mechatronic system 100 client N where the information is transmitted to a server 1220.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, no single embodiment shall be considered limiting, but rather the various embodiments and their equivalents should be construed consistently with the breadth, spirit and scope in accordance with the appended claims.

While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

What is claimed is:

1. A system comprising:
a memory that stores computer-executable components, the computer-executable components comprising:
a database access component that facilitates access to motion data from a motion equipment profile associated with an operation of a servo-driven mechatronic system;
a simulation component that populates a simulation of the operation with a parameter from the motion data and runs the simulation; and
an analysis component that tunes the parameter based on a result of the simulation; and
a processor, communicatively coupled to the memory, that facilitates execution of at least one of the computer-executable components.

2. The system of claim 1, wherein the database access component selects a subset of a set of available databases for use in the simulation.

3. The system of claim 1, wherein the database access component creates a user defined preconfigured database for use in the simulation.

4. The system of claim 1, further comprising a backlash component that determines a resonance characteristic associated with a design of the servo driven mechatronic system.

5. The system of claim 4, wherein the backlash component facilitates a change of a backlash parameter of the simulation.

6. The system of claim 1, further comprising a network component that simulates an influence of a network on a stability of the servo driven mechatronic system.

7. The system of claim 6, wherein the network component changes a network configuration parameter of the simulation.

8. The system of claim 1, further comprising a controller component that predicts a control loop parameter of the simulation.

9. The system of claim 8, wherein the controller component tunes the predicted control loop parameter.

10. The system of claim 9, wherein the controller component tunes the predicted control loop parameter based on an application type.

11. The system of claim 10, wherein the controller component enables selection of a control parameter for inclusion in a tuning calculation that tunes the predicted control loop parameter.

12. The system of claim 1, further comprising:
an interface component that receives a user selection of the parameter; and
a visualization component that creates a graphical representation of the result of the simulation in a plurality of graphs representing different aspects of the simulation.

13. A method, comprising:
employing a processor to facilitate execution of computer-executable instructions stored on a computer-readable storage medium to perform operations, comprising:
obtaining preconfigured motion profile data for a motion application of a servo-driven mechatronic system;
populating a parameter of a simulation of the motion application according to the motion profile;
simulating the motion application according to the simulation; and
tuning the parameter based on a result of the simulating.

14. The method of claim 13, further comprising employing the processor to perform receiving a selection of an automatic mode of selection of a control parameter of the simulation.

15. The method of claim 14, further comprising employing the processor to perform receiving an application type for the automatic mode.

16. The method of claim 15, further comprising employing the processor to perform calculating the control parameter utilizing a correction value.

17. The method of claim 13, further comprising:
employing the processor to perform:
displaying the result of the simulating;
based on the displaying, receiving an input that further tunes the parameter, and
re-simulating the motion application with the tuned parameter.

18. The method of claim 13, further comprising employing the processor to perform sharing the result of the simulating with a disparate servo driven mechatronic system communicatively connected to the servo driven mechatronic system.

19. A non-transitory computer-readable medium having instructions stored thereon that, in response to execution, cause a system including at least one processor to perform operations, comprising:
collecting motion data for a motion application of a servo-driven mechatronic system from a preconfigured motion equipment database;
populating a parameter of a simulation of the motion application according to the motion data;
simulating the motion application according to the simulation; and
tuning the parameter based on a result of the simulating.

20. The computer-readable medium of claim 19, wherein the operations further comprise:
populating a second parameter of the simulation, according to the motion data wherein the second parameter is a control loop parameter, a compliance parameter, a backlash parameter, or a network parameter; and
tuning the second parameter based on the result.

* * * * *